(12) United States Patent
Huberman et al.

(10) Patent No.: US 7,707,575 B2
(45) Date of Patent: Apr. 27, 2010

(54) SYSTEM AND METHOD FOR SELECTING A PORTFOLIO OF RESOURCES IN A HETEROGENEOUS DATA CENTER

(75) Inventors: Bernardo Huberman, Palo Alto, CA (US); Scott H. Clearwater, Portola Valley, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1619 days.

(21) Appl. No.: 10/944,966

(22) Filed: Sep. 20, 2004

(65) Prior Publication Data

US 2006/0064490 A1    Mar. 23, 2006

(51) Int. Cl.
*G06F 9/46* (2006.01)
*G06F 21/00* (2006.01)
(52) U.S. Cl. .................... 718/100; 718/104; 705/52
(58) Field of Classification Search ............... 718/104, 718/105, 100; 705/52
See application file for complete search history.

(56) References Cited

U.S. PATENT DOCUMENTS

| | | | |
|---|---|---|---|
| 3,911,517 A | 10/1975 | Davis | |
| 4,591,980 A | 5/1986 | Huberman et al. | |
| 4,835,680 A | 5/1989 | Hogg et al. | |
| 4,835,732 A | 5/1989 | Huberman et al. | |
| 5,394,324 A | 2/1995 | Clearwater | |
| 5,526,477 A | 6/1996 | McConnell et al. | |
| 5,530,520 A | 6/1996 | Clearwater | |
| 5,761,091 A * | 6/1998 | Agrawal et al. | ............. 702/186 |
| 5,808,920 A | 9/1998 | Zwan et al. | |
| 5,826,244 A | 10/1998 | Huberman | |
| 5,966,280 A | 10/1999 | Cerminara et al. | |
| 5,991,270 A | 11/1999 | Zwan et al. | |
| 6,027,112 A | 2/2000 | Guenther et al. | |
| 6,078,906 A | 6/2000 | Huberman | |
| 6,085,216 A * | 7/2000 | Huberman et al. | .......... 718/104 |
| 6,098,028 A | 8/2000 | Zwan et al. | |

(Continued)

OTHER PUBLICATIONS

Baker et al. GridMonitor: Integration of Large Scale Facility Fabric Monitoring with Meta Data Service in Grid Environment 2003, Computing in High Energy and Nuclear Phsyics (pp. 1-8).*

(Continued)

*Primary Examiner*—Meng-Ai An
*Assistant Examiner*—Caroline Arcos

(57) ABSTRACT

Embodiments of the present invention relate to a system and method facilitating selection of a portfolio of computational resources for a project. The system and method may comprise determining computational resource capacity characteristics from historical usage data relating to use of a heterogeneous inventory of computational resources, the computational resource capacity characteristics comprising a trace history representative of the availability of various components of the heterogeneous inventory of computational resources at various points in time. Additionally, embodiments of the present invention may comprise calculating a plurality of finishing times for a project by performing a plurality of simulation runs based on the computational resource capacity characteristics, wherein each of the plurality of simulation runs begins at a different time in the trace history. Further, embodiments of the present invention may comprise assembling the plurality of finishing times into a distribution, constructing a risk measure using the distribution, and facilitating selection of a portfolio for the project from the heterogeneous inventory of computational resources based on the risk measure and the plurality of finishing times.

25 Claims, 3 Drawing Sheets

U.S. PATENT DOCUMENTS

| | | |
|---|---|---|
| 6,115,718 A | 9/2000 | Huberman et al. |
| 6,119,052 A | 9/2000 | Guenther et al. |
| 6,272,507 B1 | 8/2001 | Pirolli et al. |
| 6,377,907 B1 * | 4/2002 | Waclawski ............... 702/182 |
| 6,400,372 B1 | 6/2002 | Gossweiler et al. |
| 6,415,368 B1 | 7/2002 | Glance et al. |
| 6,441,817 B1 | 8/2002 | Gossweiler et al. |
| 6,470,269 B1 | 10/2002 | Adar et al. |
| 6,618,742 B1 * | 9/2003 | Krum ....................... 718/100 |
| 6,631,451 B2 | 10/2003 | Glance et al. |
| 7,184,945 B1 * | 2/2007 | Takahashi et al. ............ 703/22 |
| 7,191,329 B2 * | 3/2007 | Murphy ..................... 713/100 |
| 7,386,537 B2 * | 6/2008 | Huberman et al. ............ 707/2 |
| 2002/0073009 A1 | 6/2002 | Hogg et al. |
| 2002/0116441 A1 * | 8/2002 | Ding et al. ................ 709/105 |
| 2002/0147895 A1 | 10/2002 | Glance et al. |
| 2003/0074166 A1 | 4/2003 | Jackson et al. |
| 2004/0236817 A1 * | 11/2004 | Huberman et al. .......... 709/200 |
| 2004/0267897 A1 * | 12/2004 | Hill et al. ................ 709/217 |
| 2005/0108380 A1 * | 5/2005 | Odhner et al. ............. 709/223 |
| 2005/0149940 A1 * | 7/2005 | Calinescu et al. .......... 718/104 |
| 2005/0216234 A1 * | 9/2005 | Glas et al. ................ 702/186 |
| 2005/0228875 A1 * | 10/2005 | Monitzer et al. ........... 709/221 |
| 2006/0248510 A1 * | 11/2006 | Dournov et al. ............ 717/124 |
| 2007/0078960 A1 * | 4/2007 | Dawson et al. ............. 709/223 |

OTHER PUBLICATIONS

Ramsey, A Contribution to the Theory of Taxation, The Economic Journal, vol. 37, No. 145, Mar. 1927, Blackwell Publishing for the Royal Economic Society (47-61).*

Ramsey, A Mathematical Theory of Saving, The Economic Journal, vol. 38, No. 152. Dec. 1928, Blackwell Publishing for the Royal Economic Society (pp. 543-559).*

Haber, Fred, Price Determination in Theory and Reality, 2000, Atlantic Publishers and Distributors, p. 32.*

* cited by examiner

SYSTEM AND METHOD FOR SELECTING A PORTFOLIO OF RESOURCES IN A HETEROGENEOUS DATA CENTER

BACKGROUND

Computational resources may be defined as any of the mechanical, magnetic, electronic, and electrical components that form a computer system. There may be limited computational resource availability for a given project. For example, a company may own a set of computers, a number of which are already consumed by functions outside of the project. If the project is large enough, it may exceed the capacity of any single resource in the set of resources available for use on the project. Further, it may be necessary to combine resources because it is not feasible to obtain or use a state-of-the-art resource that has the appropriate capabilities (e.g., because costs associated with such a resource are prohibitive under a limited budget). Thus, it may be necessary to utilize a collection of multiple computational resources for the project.

Collections of computational resources are typically subject to capability upgrades over time. For example, computer resources may be upgraded to handle increased system burdens. Further, certain computational resources may require upgrades because they become obsolete or because they fail (e.g., a license may expire or a hardware component may no longer suffice to run newer software applications). In these situations, it may not be feasible to upgrade an entire collection of computational resources due to budget constraints and/or time limitations (e.g., availability of personnel). Accordingly, some computational resources allocated to a particular project may have upgrades while others do not. This may result in multiple generations of technology (e.g., various hardware capabilities) within a single collection of computational resources. This multi-generational technology results in a heterogeneous computational resource environment. Difficulties arise in such environments with the assembly of computational resources to efficiently and adequately address certain project needs.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many computational resource inventories (e.g., servers owned by a company) include multi-generational technology. Accordingly, such computation resource inventories comprise a heterogeneous computational resource environment. It is now recognized that it may be beneficial to construct an optimal portfolio of resources from such heterogeneous computational resource environments for use on particular projects. For example, it may be desirable to construct an optimal portfolio of resources for a given project based on resource availability, project size and budget, desired finishing time, and degree of risk.

Figure 1:
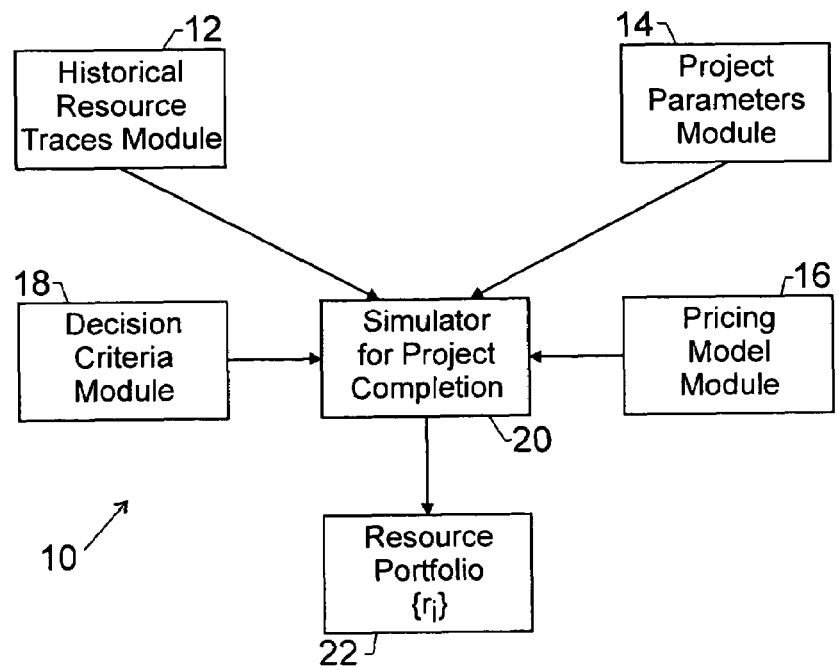
FIG. 1 is a block diagram of a portfolio selection system in accordance with embodiments of the present invention.

FIG. 1 is a block diagram of a portfolio selection system (PSS) 10 in accordance with embodiments of the present invention. Such a PSS 10 may comprise a software or hardware application that facilitates or performs a decision making process relating to how much of each resource in a set of resources should be utilized for a given project. Further, the PSS may take into account the need to comply with project limitations and constraints. The purpose of the PSS may be to optimize the resource mix with respect to some given decision criteria involving time and cost tradeoffs. For example, a PSS 10 in accordance with embodiments of the present invention may take historical resource utilization, anticipated project needs, and available resources into account when making resource allocation decisions. The PSS 10 may incorporate various modules, as illustrated by FIG. 1. While FIG. 1 separately delineates specific modules, in other embodiments, individual modules may be split into multiple modules. Similarly, multiple modules in FIG. 1 may be combined into a single module in accordance with embodiments of the present invention. Further, individual modules and components may comprise hardware, software or some combination thereof.

In particular, the modules illustrated by FIG. 1 comprise a historical resource trace module 12, a project parameter module 14, a pricing model module 16, a decision criteria module 18, and a simulator for project completion 20. The historical resource trace module 12 may function as a data collection tool and/or a database containing information collected during project operations. This information or data may comprise one or more data traces that can be used to analyze resource allocation. The project parameter module 14 may function to collect and/or store information relating to project requirements, such as memory and CPU requirements. The pricing model module 16 may perform calculations or store data relating to pricing information and rates associated with computer resource services. The decision criteria module 18 may function to determine whether certain project scenarios should be accepted or rejected based on predetermined or continuously updated criteria. The simulator 20 may operate with each of the modules 12, 14, 16, and 18 to output a resource portfolio $\{r_i\}$ 22. The final result in accordance with embodiments of the present invention, the resource portfolio 22, may comprise a list or a plurality of lists of available computational resources that may satisfy the requirements of a particular project.

The PSS 10 in accordance with embodiments of the present invention may address resource utilization issues that develop when attempting to use a collection of computational resources for a particular project. A collection of computational resources may generally be subject to capability upgrades over time due to obsolescence, resource failure, and so forth. For example, Moore's Law observes that technological advances have produced an exponential growth in the number of transistors per integrated circuit and predicts that this trend will continue. Consequently, it is now recognized that when budgeting for the maintenance and replacement of computational resources it is beneficial to include built-in periodic upgrades.

Periodic upgrades may result in the presence of a plurality of technological generations in a single collection of computational resources. In other words, periodic technological upgrades may result in the heterogeneous computational resource environment discussed above. For example, a Utility Data Center (UDC) will generally have at least two generations of technology operating at any time. A UDC may be defined as a data center (e.g., inventory of computational resources) utilized in the purchase and sale of computation, much like the purchase and sale of electricity. In some embodiments of the present invention, a UDC may be a combination of hardware and software to enable rapid deployment of virtualized resources, virtual networking, virtual storage, and virtual servers. In accordance with some embodiments of the present invention, a UDC is any plurality of computational resources.

It has now been recognized that a heterogeneous environment, such as a UDC, can present many challenges. For example, one challenge for UDC operators is to construct an optimal portfolio of resources with respect to user supplied constraints. Such user supplied constraints may comprise project size, budget, desired finishing time, and degree of risk. Each constraint may have a corresponding definition. Specifically, the degree of risk constraint may be defined in a number of ways. For example, risk may be defined by the standard deviation of a distribution of projected finishing times (e.g., finishing times predicted by a simulator based on different criteria) or by a percentile of the distribution projected finishing times (e.g., the ninetieth percentile).

Figure 2:
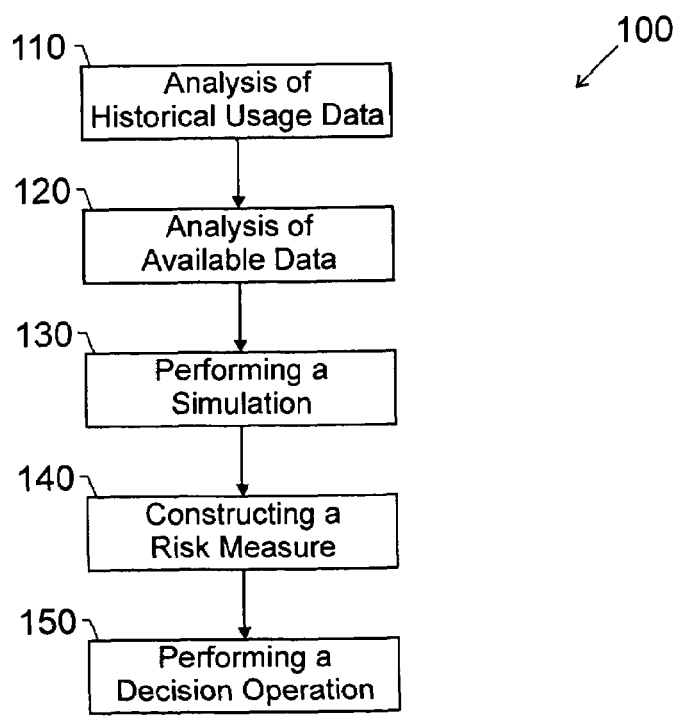
FIG. 2 is a block diagram illustrating a method of portfolio selection in accordance with embodiments of the present invention.

FIG. 2 is a block diagram illustrating a method of portfolio selection 100 in accordance with embodiments of the present invention. The portfolio selection method 100 may incorporate various operations, as illustrated by FIG. 2. While FIG. 2 separately delineates specific operations, in other embodiments, individual operations may be split into multiple operations. Similarly, multiple operations in FIG. 2 may be combined into a single operation in accordance with embodiments of the present invention. In particular, the operations illustrated by FIG. 2 comprise: analysis of historical usage data 110, analysis of available capacity 120, performing a simulation 130, constructing a risk measure 140, and performing a decision operation 150. In one embodiment of the present invention, these operations may be performed by the modules of system 10.

In one embodiment of the present invention, the methodology for determining the best resource portfolio for a project may involve using historical usage data (block 110) from a collection of computational resources under consideration for a project. For example, tracking software and/or hardware may be used to obtain historical usage data for resources in inventory. The historical usage data so obtained may then be utilized to determine capacity characteristics of the resources. In one embodiment of the present invention, an available capacity analysis (block 120) may be performed in which the spare capacity of the collection of resources, as a function of time, may be assumed available for the project. Next, a simulation (block 130) may be performed wherein the simulation takes into account available resources and calculates a finishing time for the project. In one embodiment of the present invention, the simulation (block 130) may be run many times, each one starting at different times in a trace history (e.g., data relating to computer resource usage per minute over a designated time period). Results from the simulation (block 130) may comprise a sampling of finishing times. The sampling of finishing times may be assembled into a distribution and used to construct a risk measure (block 140) (e.g., to construct a standard deviation of the distribution of projected finishing times). The risk measure, when combined with the finishing times determined in block 130, may be used in a decision making operation (block 150) to select an optimal portfolio. In one embodiment of the present invention, the optimal portfolio may consist of the amount of each resource to be used, $\{r_i\}$.

In one embodiment of the present invention, it may be assumed that spare cycles (e.g., CPU usage/minute) from each resource in a computational resource inventory will be consumed by a given project. Accordingly, in a case with R resources, the size of the project in cycles may be calculated as follows:

$$P = T \sum_{i=1}^{R} f_i c_i N_i (1 - \langle U_i \rangle),$$

where the quantities are defined as follows:
P=size of a project in cycles.
$f_i$=fraction of cycles dedicated to resource i, in other words the contribution of the ith resource to the portfolio.
$c_i$=clock speed of the ith resource.
$N_i$=number of CPUs available for the ith resource.
$\langle U_i \rangle$=average utilization of the ith resource.
T=time for the project to complete.

It should be noted that each term in the sum gives the number of cycles that each resource contributes to the project and $\Sigma f_i = 1$. Further, the time for finishing may be the same for each resource which corresponds to the project finishing time.

A price function in accordance with embodiments of the present invention may be derived from the Ramsey equation, which may provide the optimal difference between prices and marginal costs. The Ramsey equation is as follows:

$$\alpha N(p(q), q) + \frac{\partial N}{\partial p}(p(q) - c(q)) = 0,$$

where $\alpha$ is the Ramsey parameter (amount of profit allowed in free market) and c(q) is the cost to the supplier for the qth unit. Assuming a form for N(p,q), $$N(p(q),q) = N_0 \exp[-q/q_m(p_m/(p_m-p))].$$

Solving for price p, the following equation may be derived:

$$p = \frac{qp_m + 2\alpha p_m q_m - \sqrt{qp_m(qp_m + 4\alpha q_m(p_m - c))}}{2\alpha q_m},$$

where $q_m$ and $p_m$ are the demand and price parameters determined empirically.

Table 1 below comprises data relating to a test case with two resources (Resource 1 and Resource 2) available for project utilization. One of ordinary skill in the art will recognize that more than two resources may be incorporated and computed in accordance with embodiments of the present invention. However, in the interest of providing a simple example of an embodiment of the present invention, only two resources are utilized in the present example. This data may be used to illustrate how portfolios can be constructed in accordance with embodiments of the present invention. Indeed, in the following illustrations, this data is utilized to demonstrate how a PSS in accordance with embodiments of the present invention may be used to allocate computational resources in a heterogeneous data center taking into account variable supply, demand, and budget considerations. It should be noted that behavior can occur in which non-obvious tradeoffs exist between finishing time and the risk of finishing (e.g., the variance in the finishing time distribution).

TABLE 1

| Quantity | Resource 1 | Resource 2 | Project Demand |
|---|---|---|---|
| clock speed $c_i$ (GHz) | 1.5 | 3.0 | 2.0 |
| Total CPUs available (N) | 100 | 100 | 100 |
| avg. Utilization (<U>) | 0.75 | 0.90 | 0.2 |
| (min U, max U) | (0.5, 1.0) | (0.8, 1.0) | (0.15, 0.25) |
| Cycles available for project = c*N*(1 − <U>) | 37.5 | 30.00 | 40.00 |

Specifically, the data in Table 1 comprises exemplary resource demand (and availability) and project demands. These data are randomly distributed as shown. The data from Table 1 may be utilized in accordance with embodiments of the present invention to develop graphs to assist in determining an optimal portfolio. For example, using the equations listed above, data relating to cost may be plotted against data relating to risk and time to completion. Additionally, a fraction of resource usage value may be defined and plotted with respect to time and cost. For example, the following figures illustrate results of one thousand runs at twenty different fractions of fast CPUs, ($f_{fast}$) These figures demonstrate that it is not obvious a prior what mixture of resources will be optimal according to a given decision criterion for an optimal project portfolio. Specifically, the following figures illustrate curves that may be used to determine an optimal portfolio for the project demand data illustrated in Table 1. It should be noted that different curves are possible under different assumptions. However, these curves demonstrate how a PSS can construct the curves necessary to integrate with some decision criteria to arrive at a portfolio decision.

Figure 3:
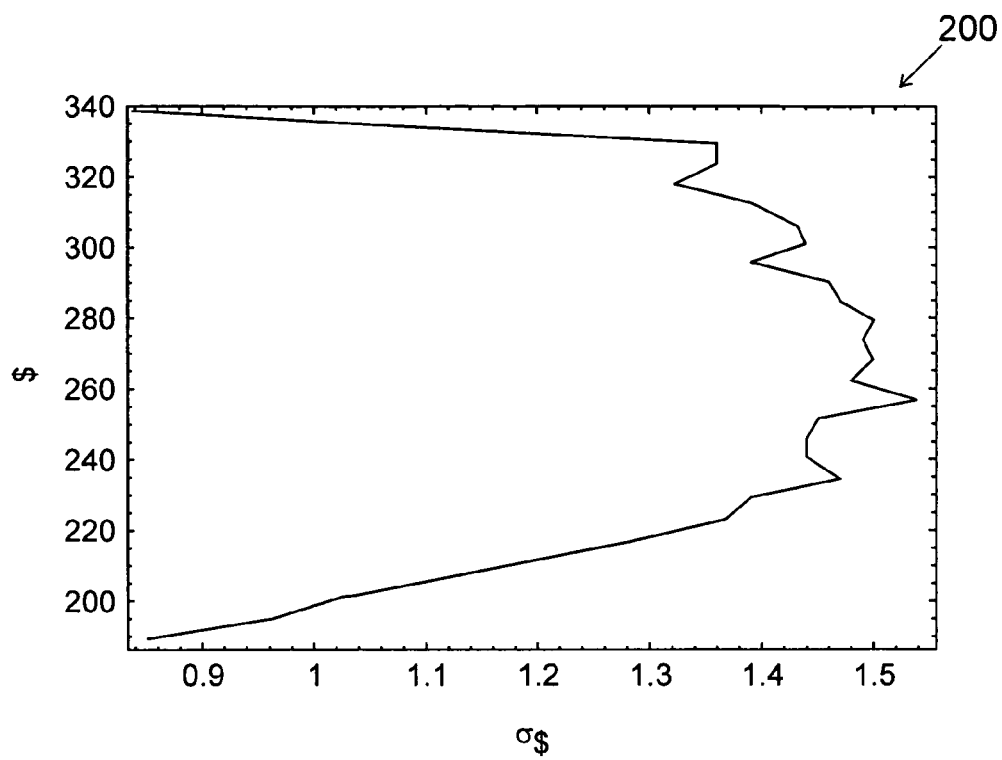
FIG. 3 is a project cost versus deviation of cost graph derived by a portfolio selection system in accordance with embodiments of the present invention.

FIG. 3 is a project cost versus deviation of cost graph 200 derived by a PSS in accordance with embodiments of the present invention. Specifically, FIG. 3 illustrates a comparison of project cost (revenue to UDC) and the standard deviation of cost ($\sigma_\$$), where the standard deviation of cost is essentially a risk calculation (e.g., fluctuations around a mean determination). As shown in FIG. 3, the project cost is on the Y-axis and the associated standard deviation of cost is on the X-axis. This graph 200, along with the graphs that follow, may illustrate that a PSS can construct the curves necessary to integrate with decision criteria to arrive at a portfolio decision. It should be noted that the cheapest and costliest options, corresponding to all slow or all fast CPUs, may have smaller variability than other combinations. For example, at a project cost of $340 (corresponding to using all fast CPUs), the standard deviation of cost may essentially be equivalent to the standard deviation of cost at a project cost of $185 (corresponding to using all slow CPUs). Specifically, according to the graph 200, the risk or standard deviation cost is approximately 0.85 at project costs of both $185 and $340 (the cheapest and costliest options, respectively).

Figure 4:
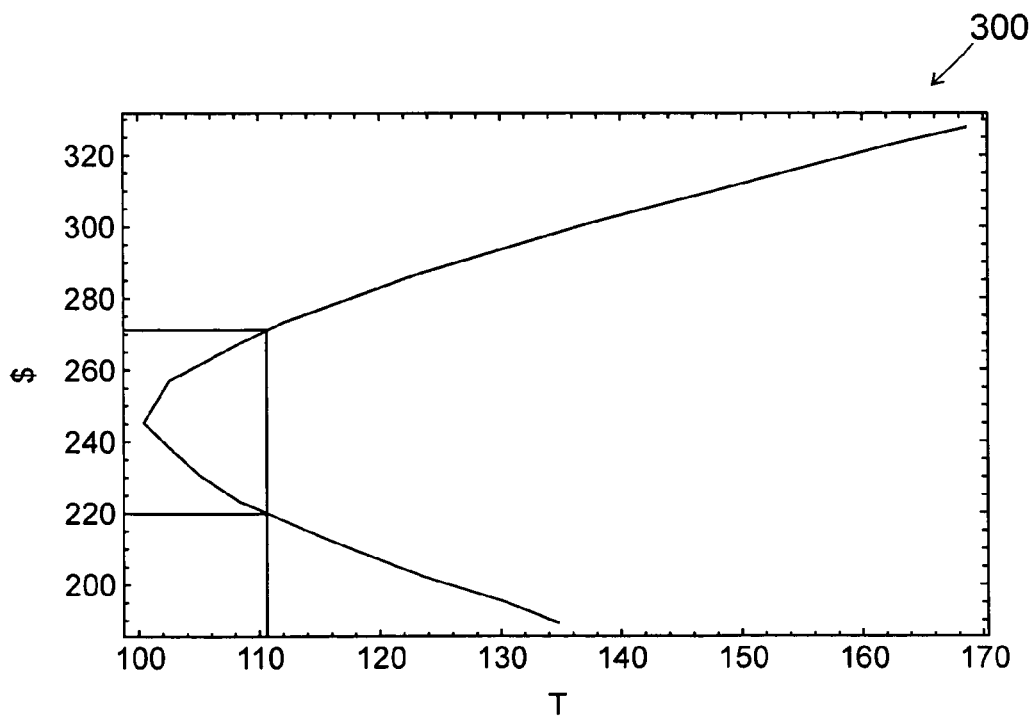
FIG. 4 is a cost versus time graph derived by a portfolio selection system in accordance with embodiments of the present invention.

FIG. 4 is a cost versus time graph 300 derived by a PSS in accordance with embodiments of the present invention. Specifically, the graph 300 is a plot of project costs, "$", versus time required for project completion, "T." As illustrated by the graph 300, there are generally two project costs associated with completing a project by a particular completion time in accordance with the illustrated data. For example, a decision criterion may be, "Choose the portfolio with the minimum cost such that the finishing time is less than 110." In the graph 300, the finishing time of 110 corresponds to project costs of approximately $220 and project costs of approximately $270. Accordingly, based on the criterion, the lower of the two costs ($220) should be chosen. Further, any rational decision maker will generally choose a point somewhere along the bottom arm of the curve illustrated in the graph 300. It should be noted that the minimum finishing time corresponds to an intermediate cost and that the minimum cost portfolio corresponds to a much longer finishing time.

Figure 5:
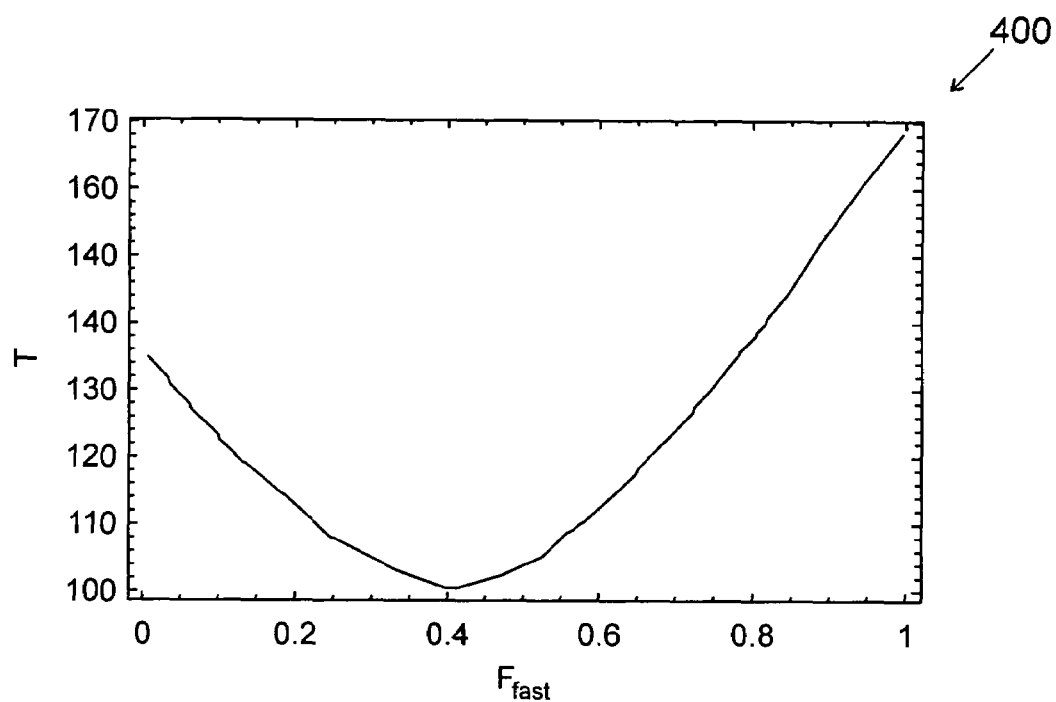
FIG. 5 is a time versus fraction of fast CPUs graph derived by a portfolio selection system in accordance with embodiments of the present invention.

FIG. 5 is a time versus fraction of fast CPUs graph 400 derived by a PSS in accordance with embodiments of the present invention. Specifically, the graph 400 has an X-axis representing a fraction of fast CPUs ($f_{fast}$) and a Y-axis representing time required for project completion, T. The fraction of fast CPUs ($f_{fast}$) value is based on the data illustrated in Table 1. Specifically, the $f_{fast}$ value represents the percentage of CPUs from Resource 2 assigned to a project. However, in other embodiments, more than two CPU speeds may be taken into account. Turning now to the example presented above, according to the graph 400, the finishing time of 110 corresponds to two fractions of fast CPUs ($f_{slow}, f_{fast}$=0.24, 0.76 and $f_{slow}, f_{fast}$=0.6, 0.4). In other words, for a project requiring a finishing time of 110 within the limitations of the above example, the computational resource allocation may comprise either 24% Resource 2 or 60% Resource 2 with the balance being Resource 1. It should be noted that the time to finish the distribution has a clear minimum in a non-monotonic function.

Figure 6:
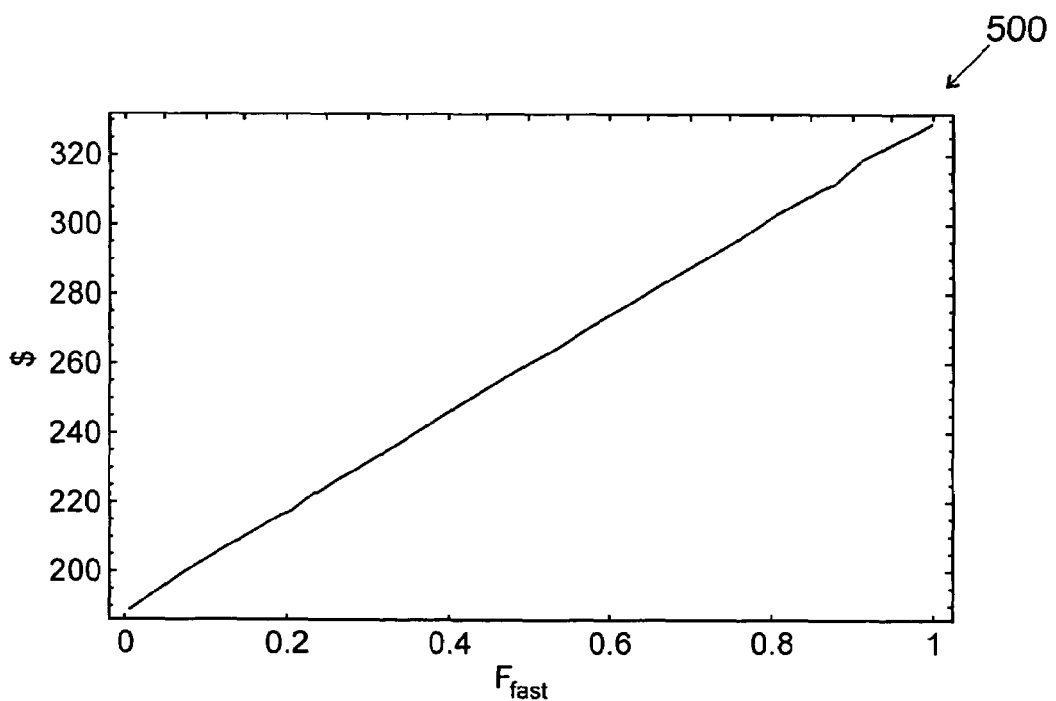
FIG. 6 is a cost versus fraction of fast CPUs graph derived by a portfolio selection system in accordance with embodiments of the present invention.

FIG. 6 is a cost versus fraction of fast CPUs graph 500 derived by a PSS in accordance with embodiments of the present invention. Specifically, the graph 500 has an X-axis representing the fraction of fast CPUs ($f_{fast}$) and a Y-axis representing associated costs, $. Based on the information obtained from graph 400, graph 500 can be used to compare the costs relating to the two different scenarios. For example, as discussed above, according to graph 400, two resource allocation scenarios will achieve the time limitations (finishing time of 110) of the example presented above. The associated costs for these two scenarios can be compared using graph 500. Specifically, the first scenario (using 24% Resource 2) has an associated cost of approximately $220, while the second scenario (using 60% Resource 2) has an associated cost of approximately $270. Accordingly, a rational decision maker will likely choose the lower cost scenario that achieves the project goals (i.e., 24% Resource 2).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method, comprising:
    determining computational resource capacity characteristics from historical usage data relating to use of a heterogeneous inventory of computational resources, the computational resource capacity characteristics comprising a trace history representative of the availability of various components of the heterogeneous inventory of computational resources at various points in time;
    calculating a plurality of finishing times for a project by performing a plurality of simulation runs based on respective sets of respective amounts of available computational resource capacity represented by different respective portions of the trace history, wherein each of the plurality of simulation runs begins at a different time in the trace history;
    assembling the plurality of finishing times into a distribution;
    constructing a risk measure using the distribution; and
    facilitating selection of a portfolio for the project from the heterogeneous inventory of computational resources based on the risk measure and the plurality of finishing times;
    wherein the determining, the calculating, the assembling, the constructing, and the facilitating are performed by a computer.

2. The method of claim 1, further comprising obtaining the historical usage data from the use of the heterogeneous inventory of computational resources.

3. The method of claim 1, wherein the determining comprises determining available capacity of each computational resource in a collection of the computational resources in the heterogeneous inventory of computational resources.

4. The method of claim 3, wherein the calculating comprises performing each of the simulation runs based on different respective amounts of the available capacities of the computational resources in the collection.

5. The method of claim 3, wherein the calculating comprises determining an amount of the determined available capacity consumed by the project.

6. The method of claim 1, wherein the portfolio comprises an amount of each resource in the heterogeneous inventory of computational resources to be used.

7. The method of claim 1, further comprising determining values of a measure of project cost based on the distribution of finishing times, wherein the facilitating comprises constructing a graph of the project cost measure values as a function of the risk measure values to facilitate the selection of the portfolio.

8. The method of claim 1, further comprising determining values of a measure of project cost based on the distribution of finishing times, wherein the facilitating comprises constructing a graph of the project cost measure values as a function of required time for completion of the project.

9. The method of claim 1, wherein the facilitating comprises determining an allocation of multiple of the computational resources to the project based on a model of price as a function of profit and marginal cost.

10. The method of claim 1, wherein each of the plurality of simulation runs incorporates project parameters and the facilitating comprises facilitating selection of a portfolio for the project from the heterogeneous inventory of computational resources based on a decision criterion.

11. A system, comprising:
    computing hardware operable to perform operations comprising
        determining computational resource capacity characteristics from historical usage data relating to use of a heterogeneous inventory of computational resources, the computational resource capacity characteristics comprising a trace history representative of the availability of various components of the heterogeneous inventory of computational resources at various points in time;
        calculating a plurality of finishing times for a project by performing a plurality of simulation runs based on respective sets of respective amounts of available computational resource capacity represented by different respective portions of the trace history, wherein each of the plurality of simulation runs begins at a different time in the trace history;
        assembling the plurality of finishing times into a distribution;
        constructing a risk measure using the distribution; and
        facilitating selection of a portfolio for the project from the heterogeneous inventory of computational resources based on the risk measure and the plurality of finishing times.

12. The system of claim 11, wherein the computing hardware is operable to perform operations comprising obtaining historical usage data from the use of the heterogeneous inventory of computational resources.

13. The system of claim 11, wherein the computing hardware is operable to perform operations comprising determining available capacity of a collection of resources in the heterogeneous inventory of computational resources.

14. The system of claim 13, wherein in the calculating the computing hardware is operable to perform operations comprising calculating the plurality of finishing times based on the determined available capacity.

15. The system of claim 11, wherein the computing hardware is operable to perform operations comprising providing an amount of each resource in the heterogeneous inventory of computational resources to be used.

16. The system of claim 11, wherein the computing hardware is operable to perform operations comprising determining an allocation of multiple of the computational resources to the project based a model of price as a function of profit and marginal cost.

17. The system of claim 11, wherein the computing hardware is operable to perform operations comprising determining values of a measure of project cost based on the distribution of finishing times, and in the facilitating the computing hardware is operable to facilitate the selection of a portfolio for the project based on the project cost measure values.

18. The system of claim 11, wherein the computing hardware is operable to perform operations comprising incorporating project parameters and decision criterion into the simulation.

19. A computer-readable storage medium comprising computer-readable instructions that, when executed by a computer, cause the computer to perform operations comprising:
    determining computational resource capacity characteristics from historical usage data relating to use of a heterogeneous inventory of computational resources, the computational resource capacity characteristics comprising a trace history representative of the availability of various components of the heterogeneous inventory of computational resources at various points in time;

calculating a plurality of finishing times for a project by performing a plurality of simulation runs based on respective sets of respective amounts of available computational resource capacity represented by different respective portions of the trace history, wherein each of the plurality of simulation runs begins at a different time in the trace history;

assembling the plurality of finishing times into a distribution;

constructing a risk measure using the distribution; and facilitating selection of a portfolio for the project from the heterogeneous inventory of computational resources based on the risk measure and the plurality of finishing times.

20. The computer-readable storage medium of claim 19, wherein, when executed by a computer, the computer-readable instructions cause the computer to perform operations comprising obtaining historical usage data from the use of the heterogeneous inventory of computational resources.

21. The computer-readable storage medium of claim 19, wherein, when executed by a computer, the computer-readable instructions cause the computer to perform operations comprising taking into account a determined available capacity.

22. The computer-readable storage medium of claim 19, wherein, when executed by a computer, the computer-readable instructions cause the computer to perform operations comprising providing an amount of each resource in the heterogeneous inventory of computational resources to be used.

23. The computer-readable storage medium of claim 19, wherein, when executed by a computer, the computer-readable instructions cause the computer to perform operations comprising determining an allocation of multiple of the computational resources to the project based a model of price as a function of profit and marginal cost.

24. The computer-readable storage medium of claim 19, wherein, when executed by a computer, the computer-readable instructions cause the computer to perform operations comprising determining values of a measure of project cost based on the distribution of finishing times, and the facilitating comprises facilitating the selection of a portfolio for the project based on the project cost measure values.

25. The method of claim 1, wherein the trace history represents spare capacity of the various components of the heterogeneous inventory of computational resources as a function of time.

* * * * *

UNITED STATES PATENT AND TRADEMARK OFFICE
CERTIFICATE OF CORRECTION

| | | |
|---|---|---|
| PATENT NO. | : 7,707,575 B2 | Page 1 of 1 |
| APPLICATION NO. | : 10/944966 | |
| DATED | : April 27, 2010 | |
| INVENTOR(S) | : Bernardo Huberman et al. | |

It is certified that error appears in the above-identified patent and that said Letters Patent is hereby corrected as shown below:

In column 8, line 45, in Claim 16, after "based" insert -- on --.

In column 9, line 3, in Claim 11, after "comprising" insert -- : --.

In column 10, line 10, in Claim 23, after "based" insert -- on --.

Signed and Sealed this

Twenty-eighth Day of December, 2010

David J. Kappos
*Director of the United States Patent and Trademark Office*